(12) United States Patent
Wang et al.

(10) Patent No.: US 10,284,683 B2
(45) Date of Patent: May 7, 2019

(54) CHANNEL ACCESS METHOD AND SYSTEM

(71) Applicant: GUANGZHOU HUADUO NETWORK TECHNOLOGY CO., LTD., Guangzhou, Guangdong (CN)

(72) Inventors: Qiang Wang, Guangdong (CN); Lulin He, Guangdong (CN); Tielei Peng, Guangdong (CN)

(73) Assignee: GUANGZHOU HUADUO NETWORK TECHNOLOGY CO., LTD., Guangzhou (CN)

( * ) Notice: Subject to any disclaimer, the term of this patent is extended or adjusted under 35 U.S.C. 154(b) by 331 days.

(21) Appl. No.: 15/197,710

(22) Filed: Jun. 29, 2016

(65) Prior Publication Data

US 2016/0316041 A1    Oct. 27, 2016

Related U.S. Application Data

(63) Continuation of application No. PCT/CN2014/090264, filed on Nov. 4, 2014.

(30) Foreign Application Priority Data

Dec. 31, 2013 (CN) .......................... 2013 1 0754593

(51) Int. Cl.
*G06F 15/16* (2006.01)
*H04L 29/08* (2006.01)
(Continued)

(52) U.S. Cl.
CPC .......... *H04L 67/327* (2013.01); *H04L 47/125* (2013.01); *H04L 65/1069* (2013.01);
(Continued)

(58) Field of Classification Search
CPC . H04L 67/327; H04L 21/2385; H04L 47/125; H04L 65/4076; H04L 67/26;
(Continued)

(56) References Cited

U.S. PATENT DOCUMENTS

| | | | |
|---|---|---|---|
| 8,635,641 B2 * | 1/2014 | Lee ......................... | H04N 7/163 725/116 |
| 2005/0114901 A1 * | 5/2005 | Yui ......................... | H04N 7/163 725/100 |
| 2011/0173300 A1 * | 7/2011 | Levy ....................... | H04N 7/141 709/219 |

FOREIGN PATENT DOCUMENTS

| CN | 103139656 A | 6/2013 |
|---|---|---|
| CN | 103347214 A | 10/2013 |

OTHER PUBLICATIONS

International search report of PCT Patent Application No. PCT/CN2014/090264 dated Feb. 11, 2015.
(Continued)

*Primary Examiner* — Frantz B Jean

(57) ABSTRACT

The present invention discloses a channel access method and system. The channel access method includes the steps of: receiving an access request for accessing a parent channel from a user; obtaining a reception channel information currently corresponding to the parent channel in response to the access request, wherein the reception channel information is a channel identification information of a sub channel corresponding to a preset reception channel switching requirement; and connecting the user to the sub channel identified by the obtained reception channel information according to the obtained reception channel information. The present invention makes it conducive for the user requesting an access to be connected to a preset sub channel and realize user distribution.

18 Claims, 5 Drawing Sheets

(51) Int. Cl.
    *H04N 21/2385*   (2011.01)
    *H04L 12/803*    (2013.01)
    *H04L 29/06*     (2006.01)

(52) U.S. Cl.
    CPC ...... *H04L 65/4076* (2013.01); *H04L 65/4084* (2013.01); *H04L 67/141* (2013.01); *H04L 67/42* (2013.01); *H04N 21/2385* (2013.01); *H04L 67/26* (2013.01)

(58) Field of Classification Search
    CPC . H04L 65/1069; H04L 65/4084; H04L 67/42; H04L 67/141
    USPC .......................................................... 709/229
    See application file for complete search history.

(56) References Cited

OTHER PUBLICATIONS

1st Office Action of counterpart Chinese Patent Application No. 201310754593.6 dated May 24, 2016.

\* cited by examiner

CHANNEL ACCESS METHOD AND SYSTEM

CROSS-REFERENCE TO RELATED APPLICATIONS

The present application is a Continuation Application of PCT application No. PCT/CN2014/090264 filed on Nov. 4, 2014, which claims the benefit of Chinese Patent Application No. 201310754593.6 filed on Dec. 31, 2013, the contents of which are hereby incorporated by reference.

TECHNICAL FIELD

The present invention generally relates to network technologies and, more particularly, to a channel access method and system.

BACKGROUND

At present, the number of the users of the internet live software, such as YY voice, keeps increase rapidly. The anchor user can create a channel configured to upload multimedia videos and audios. Generally, a large channel includes a number of independent sub channels through which the anchor can provide performances. When requesting for accessing a channel, an ordinary user software client is generally directly connected to a default top parent channel of the channel, which may lead to network failure, such as network congestion and network delay, when a large number of users request for accessing a same parent channel at the same time.

What is needed, therefore, is to provide a channel access method and system which can overcome the network failure at the live class client, such as network congestion and network delay.

BRIEF SUMMARY OF VARIOUS EMBODIMENTS OF THE INVENTION

One object of the present invention is to provide a channel access method and system which can overcome the network failure at the live class client, such as network congestion and network delay.

According to one embodiment of the present invention, a channel access method includes the steps of:

receiving access request for accessing a parent channel from a user;

obtaining a reception channel information currently corresponding to the parent channel in response to the access request, wherein the reception channel information is a channel identification information of a sub channel corresponding to a preset reception channel switching requirement; and connecting the user to the sub channel identified by the obtained reception channel information according to the obtained reception channel information.

According to one embodiment of the present invention, a channel access system includes:

a request receiving module, configured to receive an access request for accessing a parent channel from a user;

an access information acquisition module, configured to obtain a reception channel information currently corresponding to the parent channel in response to the access request, wherein the reception channel information is a channel identification information of a sub channel corresponding to a preset reception channel switching requirement; and a channel access module, configured to connect the user to a sub channel identified by the obtained reception channel information according to the obtained reception channel information.

According to the channel access method and system of the present invention, when an access request for accessing a parent channel is received from a user, the user is connected to the sub channel corresponding to the reception channel information currently corresponding to the parent channel. The present invention makes it conducive for the user requesting an access to be connected to a preset sub channel and realize user distribution. Network malfunctions, for instance network congestions and network delays, are prevented. The present invention also facilitates channel user management for channel administrators.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

DETAILED DESCRIPTION OF THE INVENTION

Figure 1:
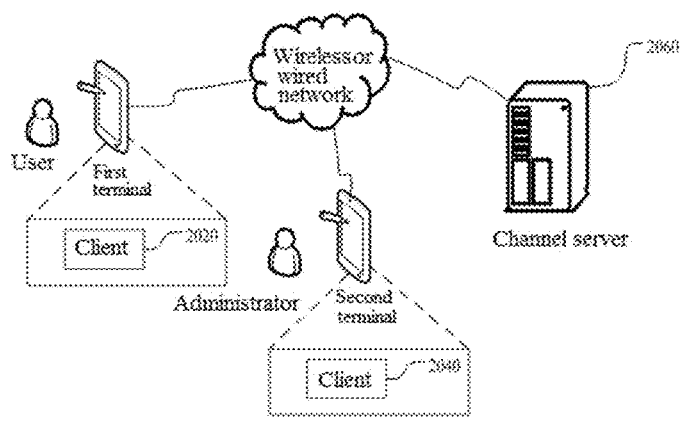
FIG. 1 depicts a schematic view of an implement environment for a channel access method according to one embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Referring to FIG. 1, FIG. 1 depicts a schematic view of an implement environment for a channel access method according to one embodiment of the present invention.

The implement environment as shown in FIG. 1 is configured to implement the channel access method according to the embodiments of the present invention, including a first terminal, a client 2020, a second terminal, a client 2040, a channel server 2060. The first terminal and the second terminal are respectively connected to the channel server 2060 via wireless network connection or wired network connection. Preferably, the client 2020 is a client that the user requests for accessing the parent channel logons. The client 2040 is a client the administrator logons.

The first terminal includes at least one of terminal equipments such as a desktop, a notebook, a personal digital assistant, a smart phone, a tablet computer, a portable media player. The first terminal is equipped with a client 2020 configured to implement the channel access method. The second terminal includes at least one of terminal equipments such as a desktop, a notebook, a personal digital assistant, a smart phone, a tablet computer, a portable media player. The second terminal is equipped with a client 2040 configured to implement the channel access method. The channel server 2060 is preferably a backend server of the client 2020 and the client 2040. The client 2020, the client 2040 and the channel server 2060 each have two or more.

The channel server 2060 can store the reception channel information corresponding to the parent channel. The reception channel information is the channel identification information of the sub channel corresponding to a preset reception channel switching requirement. The channel server 2060 can also store the determination information configured to determine whether the preset reception channel switching requirement is met. In addition, the channel server 2060 can also store the channel identification information of the parent channel and the channel identification information of the sub channel.

According to one embodiment of the present invention, the channel server 2060 includes a channel switching server and a channel information storage server. The channel switching server can store reception channel information, determination information configured to determine whether the preset reception channel switching requirement is met corresponding to the parent channel. The channel information storage server can store the channel identification information of the parent channel and the channel identification information of the sub channel.

In response to the trigger operation of the administrator, the client 2040 can generate at least one of the preset reception channel switching requirement, the determination information of the preset reception channel switching requirement and the reception channel information. The client 2040 sends at least one of the preset reception channel switching requirement, determination information of the preset reception channel switching requirement and the reception channel information to the channel server 2060, so that the channel server 2060 correspondingly store the information sent by the client 2040.

The client 2020 can receive the access request for accessing a parent channel from a user, pull the reception channel information corresponding to the parent channel from the channel server 2060, and connect the user to a sub channel corresponding to the channel information according to the reception channel information. The sub channel corresponding to the channel information is a sub channel having a channel identification information same as the channel information.

Figure 2:
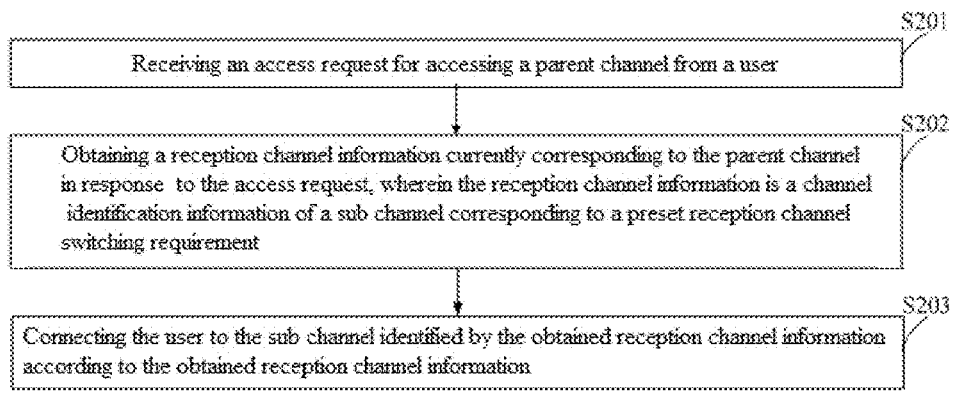
FIG. 2 depicts a schematic flow diagram of a channel access method according to a first embodiment of the present invention.

Referring to FIG. 2, FIG. 2 depicts a schematic flow diagram of a channel access method according to a first embodiment of the present invention.

The channel access method according to the first embodiment of the present invention includes the steps of:

Step S201: receiving an access request for accessing a parent channel from a user;

Step S202: obtaining a reception channel information currently corresponding to the parent channel in response to the access request, wherein the reception channel information is the channel identification information of a sub channel corresponding to a preset reception channel switching requirement;

Step S203: connecting the user to a sub channel identified by the obtained reception channel information according to the obtained reception channel information.

According to the embodiment of the present invention, when an access request for accessing a parent channel is received, the user is connected to a sub channel corresponding to the reception channel information currently corresponding to the parent channel. The present invention makes it conducive for the user requesting an access to be connected to a preset sub channel and realize user distribution. Network malfunctions, such as network congestions and network delays, are prevented. The present invention also facilitates channel user management for channel administrators.

In step S201, the parent channel may be a big channel in the live class client. The sub channel may be a small channel contained in the big channel. The channel identification information of the parent channel can obtained via the access request.

Preferably, the reception channel information currently corresponding to the parent channel is configured to connect the access request for accessing the parent channel to a preset sub channel in the sub channels of the parent channel. The preset sub channel is the sub channel identified by the reception channel information.

According to one embodiment of the present invention, prior to receiving an access request for accessing the parent channel from a user, the channel access method further includes the steps of:

obtaining the channel identification information of the sub channel corresponding to the preset reception channel switching requirement if the preset reception channel switching requirement is met;

obtaining the obtained channel identification information as the reception channel information currently corresponding to the parent channel, and storing the obtained channel identification information corresponding to the parent channel.

In step S202, the reception channel can be a preferable sub channel when the user requests for accessing the parent channel. The reception channel information can be an identification number (ID) of the sub channel corresponding to the preset reception channel switching requirement, or other channel identification information of the sub channel.

Preferably, in obtaining the reception channel information currently corresponding to the parent channel in response to the access request, the reception channel information stored corresponding to the parent channel is inquired. If the reception channel information stored corresponding to the parent channel is enquired, the enquired reception channel information is identified as the reception channel information currently corresponding to the parent channel.

Preferably, during enquiring the reception channel information currently stored in the parent channel, the channel identification information of the parent channel is read from the access request. The reception channel information stored corresponding to the parent channel is enquired according to the channel identification information of the parent channel.

According to one embodiment of the present invention, the step of obtaining the reception channel information currently corresponding to the parent channel in response to the access request includes the steps of:

enquiring the reception channel information stored corresponding to the parent channel;

obtaining the member class information of the users if the enquired reception channel information includes the channel identification information of a number of sub channels;

enquiring a preset reception class matching the member class information;

selecting channel identification information of the sub channel corresponding to the preset reception class from the enquired reception channel information as the reception channel information currently corresponding to the parent channel;

wherein the identification information of the users can be obtained via the access request, so as to obtain the stored member class information corresponding to the identification information. The member class information includes member identification, full channel manager identification, guest identification, visitor identification. The preset reception class includes visitor identification and guest identification. Preferably, when the member class information is as same as the preset reception class, the member class identification matches the preset reception class.

According to another embodiment of the present invention, the step of obtaining the reception channel information currently corresponding to the parent channel in response to the access request includes the steps of:

enquiring the reception channel information stored corresponding to the parent channel;

obtaining the current time if the enquired reception channel information includes the channel identification information of a number of sub channels;

selecting in the enquired reception channel information a channel identification information of a sub channel having a current time matching the time range as the reception channel information currently corresponding to the parent channel;

wherein the current time is the current display time of the client the user logons, or the current display time of the backend server.

Preferably, the channel identification information includes a preset time range corresponding to the reception channel information of each sub channel (reception channel). For instance, for sub channels A, B and C, 8 clock to 10 clock of each day can be set as the time range corresponding to sub channel A, 10 clock to 12 clock of each day can be set as the time range corresponding to sub channel B, 12 clock to 14 clock of each day can be set as the time range corresponding to sub channel C. If the current time is within a time range, the time range matches the current time. In addition, for sub channels A, B and C, a first time interval (every 15 minutes is defined as a time interval) after a reference time is set as the time range corresponding to the sub channel A. A second time interval is set as the time range of corresponding to sub channel B. A third time interval is set as the time range corresponding to sub channel C. The reference time is the time when the current reception channel information is set as the time the reception channel information currently corresponding to the parent channel stored corresponding to the parent channel. If the time difference between the current time and the reference time is within a time range, then the time range corresponding to the time interval matches the current time.

According to one embodiment of the present invention, the step of obtaining the reception channel information currently corresponding to the parent channel in response to the access request includes the steps of:

enquiring a reception channel information stored corresponding to the parent channel;

obtaining a number of the users in each sub channel if the enquired reception channel information includes the channel identification information of a number of sub channels;

selecting the channel identification information of the sub channel having a number of the users within the preset user number range from the enquired reception channel information as the reception channel information currently corresponding to the parent channel;

wherein the preset number range of the users is 0 to 100, or other number range according to the requirements of the client and the channel server. If the number of the users is within the user threshold, the preset user number range is met.

In addition, a user threshold can be set. The channel identification information of the sub channel having a user number larger than the user threshold is selected from the enquired reception channel information as the reception channel information currently corresponding to the parent channel.

In step S203, the user is connected to the sub channel identified by the reception channel information.

According to one embodiment of the present invention, after the step of connecting the user to sub channel identified by the obtained reception channel information according to the obtained reception channel information, the channel access method further includes the steps of:

obtaining the channel identification information of the sub channel corresponding to the preset reception channel switching requirement if the preset reception channel switching requirement is met;

switching the obtained channel identification information to the reception channel information currently corresponding to the parent channel;

wherein there may be a number of sub channels corresponding to the preset reception channel switching requirement, each time the preset reception channel requirement is met, the channel identification information of a sub channel corresponding to the preset reception channel switching requirement is obtained randomly or in a preset order, and the channel identification information is switched to a reception channel information currently corresponding to the parent channel.

Preferably, after the step of switching the obtained channel identification information to the reception channel information currently corresponding to the parent channel, the channel access method of the present invention further includes the steps of:

obtaining a preset reception channel identification information;

adding the preset reception channel identification information to the sub channel in the channel list of the parent channel.

In addition, the reception channel identification information includes colors (such as red or purple), icon or number. After the access request for accessing the parent channel from other user is received, the reception channel information stored corresponding to the parent channel is enquired. If the enquired reception channel information includes the channel identification information of a number of sub channels, the sub channel which has the preset reception channel identification information in the channel list of the parent channel is enquired, and the channel identification information of the sub channel is selected from the enquired reception channel information as the reception channel information currently corresponding to the parent channel.

According to another embodiment of the present invention, the step of obtaining the channel identification information of the sub channel corresponding to the preset reception channel switching requirement if the preset reception channel switching requirement is met includes the steps of:

detecting reception channel switching instruction corresponding to each sub channel;

determining the preset reception channel switching requirement is met if the switching instruction is detected;

obtaining the channel identification information of the sub channel corresponding to the switching instruction as the channel identification information of the sub channel corresponding to the preset reception channel switching requirement;

wherein the sub channel corresponding to the switching instruction is a sub channel identified by the channel identification information contained in the reception channel switching instruction.

According to another embodiment of the present invention, the step of obtaining the channel identification information of the sub channel corresponding to the preset reception channel switching requirement if the preset reception channel switching requirement is met includes the steps of:

determining whether the current time is in accordance with the preset switching time;

determining the preset reception channel switching requirement is met if the current time is in accordance with the preset switching time;

obtaining the channel identification information of the sub channel corresponding to the preset switching time as the channel identification information of the sub channel corresponding to the preset reception channel switching requirement;

wherein the preset switching time can be a number of fixed time each day with each fixed time corresponding to a sub channel, determining the preset reception channel switching requirement is met if the current time is any one of the fixed time.

In one embodiment of the present invention, the step of obtaining the channel identification information of the sub channel corresponding to the preset reception channel switching requirement if the preset channel switching requirement is met includes the steps of:

enquiring whether the user number of the sub channel corresponding to the current reception channel information is larger than a user threshold;

determining the preset reception channel switching requirement is met if the user number of the sub channel corresponding to the current reception channel information is larger than the user threshold;

obtaining the channel identification information of the preset candidate sub channel as the channel identification information of the sub channel corresponding to the preset reception channel switching requirement;

wherein the user threshold is 100 or any be other value set according to the requirement of the client and the channel server.

Figure 3:
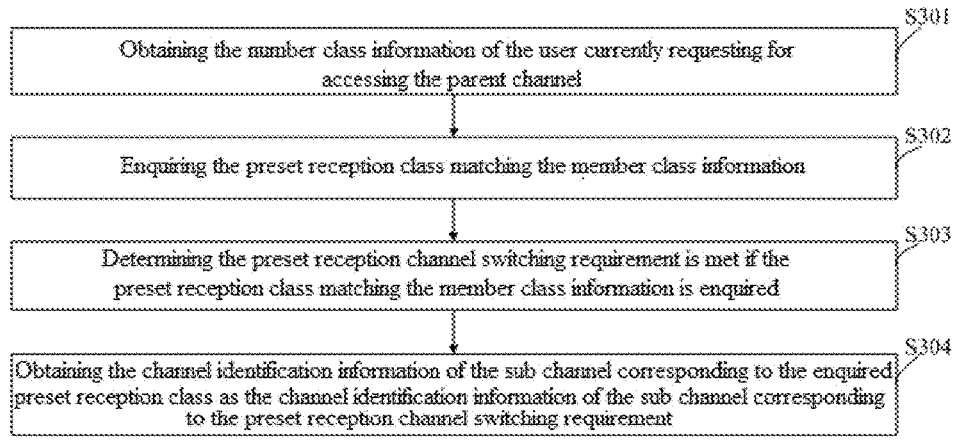
FIG. 3 depicts a schematic flow diagram of a channel access method according to a second embodiment of the present invention.

Referring to FIG. 3, FIG. 3 depicts a schematic flow diagram of a channel access method according to a second embodiment of the present invention.

The channel access method according to the second embodiment of the present invention differs from the channel access method according to the first embodiment of the present invention in that, the step of obtaining the channel identification information of the sub channel corresponding to the preset reception channel switching requirement if the preset reception channel switching requirement is met includes the steps of:

Step 301, obtaining the number class information of the user currently requesting for accessing the parent channel;

Step 302, enquiring the preset reception class matching the member class information;

Step 303, determining the preset reception channel switching requirement is met if the preset reception class matching the member class information is enquired;

Step 304, obtaining the channel identification information of the sub channel corresponding to the enquired preset reception class as the channel identification information of the sub channel corresponding to the preset reception channel switching requirement.

According to the present embodiment, different classes of users can be connected to different sub channels according to the member class information of the users.

Preferably, when an access request for accessing the parent channel from the user is received again, the member class information of the users currently requesting accessing the parent channel is obtained. The member class information stored corresponding to the identification information can be obtained via obtaining the identification of the current user according to the current access request. The member class information may include member identification, full channel manager identification, guest identification, visitor identification. The preset reception class includes visitor identification and guest identification. Preferably, when the member class information is same as the preset reception class, the member class identification matches the preset reception class.

Preferably, when there are a number of sub channels corresponding to the preset reception class, the channel identification information of a sub channel corresponding to an enquired preset reception class is obtained randomly or in a preset order.

According to one embodiment of the present invention, the step of obtaining the channel identification information corresponding to the enquired preset reception class as the channel identification information of the sub channel corresponding to the preset reception channel switching requirement includes the steps of:

determining whether the number of the users in the sub channel corresponding to the enquired preset reception class is larger than a user threshold;

obtaining the channel identification information of the sub channel corresponding to the enquired preset reception class as the channel identification information of the sub channel corresponding to the preset reception channel switching requirement if the number of the users in the sub channel corresponding to the enquired preset reception class is no more than the user threshold;

obtaining the channel identification information of other candidate sub channels corresponding to the enquired preset reception class as the channel identification information of the sub channel corresponding to the preset channel reception switching requirement if the number of the users in the sub channel corresponding to the enquired preset reception class is larger than the user threshold;

wherein when there are a number of sub channels corresponding to the preset reception class, one of the sub channels can be selected as a preferable sub channel and the other sub channels act as candidate sub channels. When the number of the users in the preferable sub channels is larger than the user threshold, the channel identification information of one sub channel corresponding to the enquired preset reception class is obtained and switched to the reception channel information.

According to one embodiment of the present invention, the step of obtaining the channel identification information of the sub channel corresponding to the enquired preset reception class as the channel identification information of the sub channel corresponding to the preset reception channel switching requirement includes the steps of:

detecting whether the current time is in accordance with a preset switching time;

obtaining the channel identification information of the sub channel corresponding to the enquired preset reception class as the channel identification information of the sub channel corresponding to the preset reception channel switching requirement if the current time is not in accordance with the preset switching time;

obtaining the channel identification information of other candidate sub channels corresponding to the enquired preset reception class as the channel identification information of the sub channel corresponding to the preset reception channel switching requirement if the current time is in accordance with the preset switching time.

Figure 4:
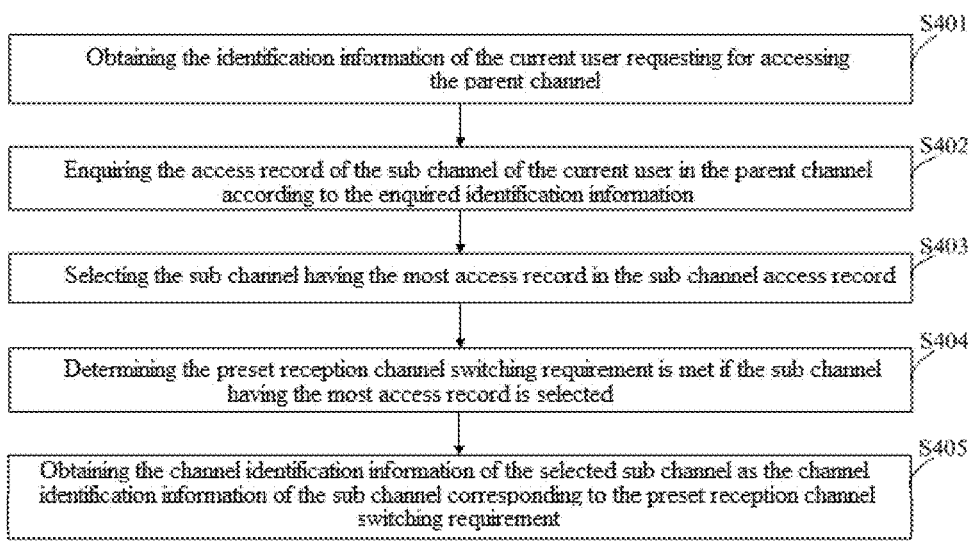
FIG. 4 depicts a schematic flow diagram of a channel access method according to a third embodiment of the present invention.

Referring to FIG. 4, FIG. 4 depicts a schematic flow diagram of a channel access method according to a third embodiment of the present invention.

The channel access method according to the third embodiment of the present invention differs from the channel access method according to the first embodiment of the present invention in that, the step of obtaining the channel identification information of the sub channel corresponding to the preset reception channel switching requirement if the preset reception channel switching requirement is met includes the steps of:

Step S401, obtaining the identification information of the current user requesting for accessing the parent channel;

Step S402, enquiring the access record of the sub channel of the current user in the parent channel according to the enquired identification information;

Step S403, selecting the sub channel having the most access record in the sub channel access record;

Step S404, determining the preset reception channel switching requirement is met if the sub channel having the most access record is selected;

Step S405, obtaining the channel identification information of the selected sub channel as the channel identification information of the sub channel corresponding to the preset reception channel switching requirement.

In the present embodiment, the sub channel accessed by most users in the parent channel is the preferable sub channel when the user requests for accessing the parent channel, to reduce the channel jump time of the users in the parent channel and improve the channel access efficiency of the users, wherein the most recorded sub channel is preferably other sub channels of the parent channel except the top channel.

According to one embodiment of the present invention, the channel identification information of the selected sub channel is obtained from the sub channel lately recorded by the current user in the sub channel record of the parent channel as the channel identification information of the sub channel corresponding to the preset reception channel switching requirement.

The channel access method according to a fourth embodiment of the present invention is detailed as following.

The channel access method according to the fourth embodiment of the present invention differs from the channel access method according to the first embodiment of the present invention in that, after the step of connecting the user to the sub channel identified by the obtained reception channel information according to the obtained reception channel information, the channel access method further includes the steps of:

pushing the preset channel information object to a preset area of the channel display interface of the client the user logons and displaying the preset channel information object in the preset area;

According to the present invention, the preset channel information object is highlighted in the client the user logons, so as to improve information push efficiency.

According to one embodiment of the present invention, the step of pushing the preset channel information object to the preset area of the channel display interface of the client the user logons displaying the preset channel information object in the preset area further includes the steps of:

pushing the preset channel information object in a center area of the channel display interface of the client and displaying the preset channel information object in the center area if the sub channel the user accesses is not in a live video status;

pushing the preset channel information object in an area outside of the center area of the channel display interface of the client and displaying the preset channel information object in the area outside of the center area if the sub channel the user accesses is in a live video status.

Preferably, the preset channel information object has a form of character, picture, video and/or web page.

Figure 5:
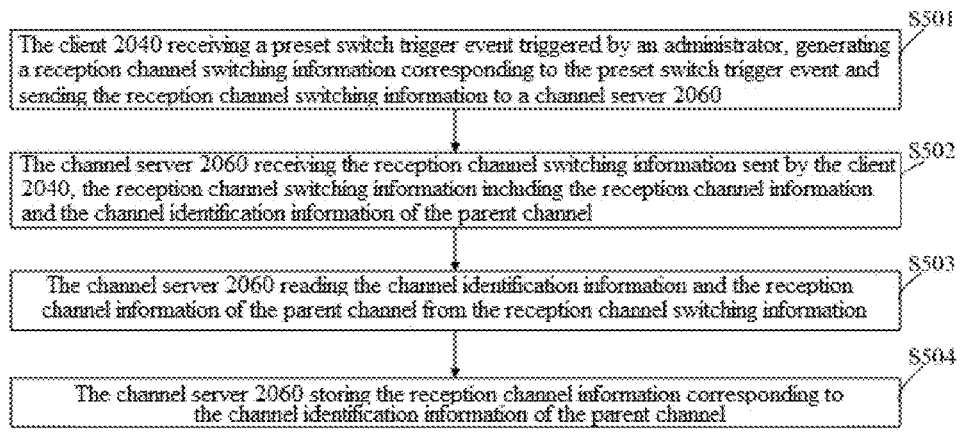
FIG. 5 depicts a schematic flow diagram of a channel access method according to a fifth embodiment of the present invention.

Referring to FIG. 5, FIG. 5 depicts a schematic flow diagram of a channel access method according to a fifth embodiment of the present invention.

The channel access method according to the fifth embodiment of the present invention differs from the channel access method according to the first embodiment of the present invention in that, prior to the step of receiving an access request for accessing the parent channel from the user, the channel access method further includes the steps of:

Step S501, the client 2040 receiving a preset switch trigger event triggered by an administrator, generating a reception channel switching information corresponding to the preset switch trigger event and sending the reception channel switching information to a channel server 2060, wherein the reception channel switching information includes the reception channel information and the channel identification information of the parent channel;

Step S502, the channel server 2060 receiving the reception channel switching information sent by the client 2040;

Step S503, the channel server 2060 reading the channel identification information and the reception channel information of the parent channel from the reception channel switching information;

Step S504, the channel server 2060 storing the reception channel information corresponding to the channel identification information of the parent channel.

In the present embodiment, the reception channel information of the parent channel is stored in the channel server corresponding to the parent channel, which can facilitate pushing the reception channel information to each client.

According to one embodiment of the present invention, the step of the client 2040 receiving a preset trigger event triggered by the administrator and generating the reception channel switching information corresponding to the preset trigger event includes the steps of:

displaying a reception channel control corresponding to the sub channel of the parent channel if the preset reception channel condition is met;

detecting the trigger event of the reception channel control;

determining the preset trigger event is met, obtaining the channel identification information of the sub channel corresponding to the reception channel control as the reception channel information, and generating a reception channel switching information corresponding to the preset trigger event if the reception trigger event is detected.

Figure 6:
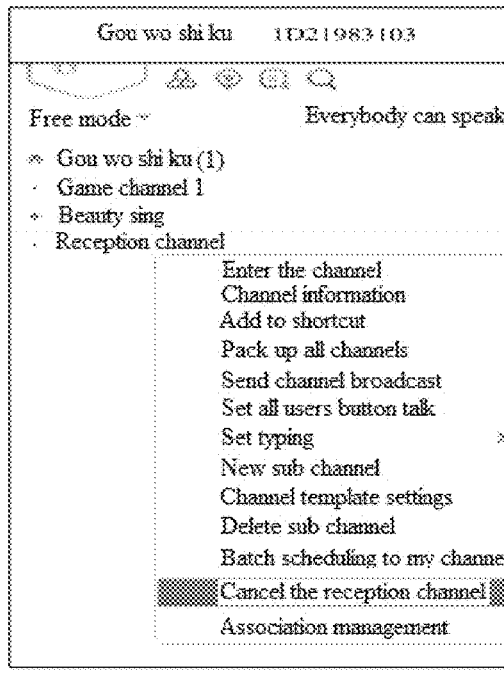
FIG. 6 depicts a schematic view of a first interface of a channel access method according to a fifth embodiment of the present invention.

As shown in FIG. 6, after the reception channel switching information is sent to the channel server 2060, the sub channel corresponding to the reception channel control is identified as the reception channel. After the preset switching trigger event triggered by the administrator is received, the cancel reception channel menu (cancel reception channel control) shown in FIG. 6 is displayed, the trigger event triggering the cancel reception channel menu is detected, the channel server 2060 is requested to delete the channel identification information of the sub channel identified as the reception channel from the reception channel information stored corresponding to the parent channel.

Figure 7:
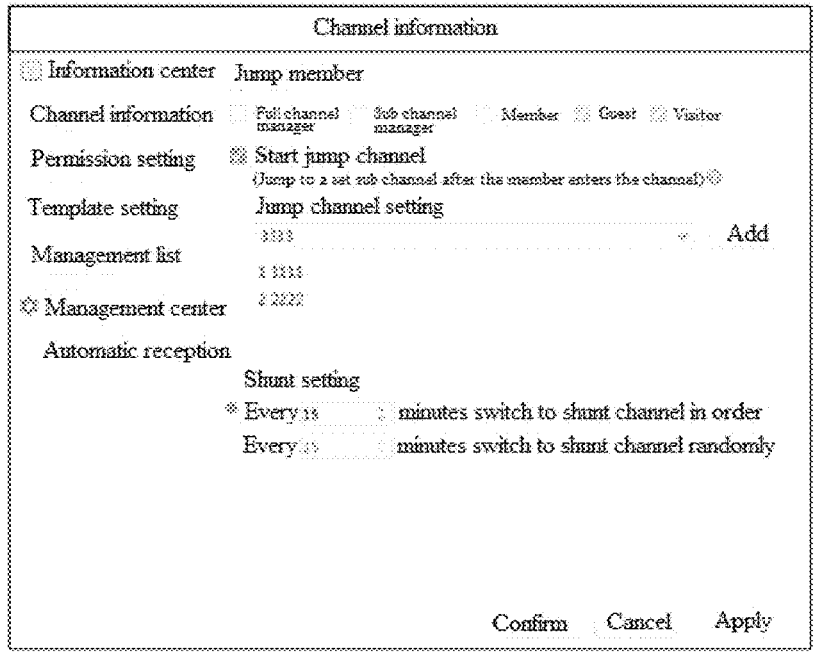
FIG. 7 depicts a schematic view of a second interface of a channel access method according to a fifth embodiment of the present invention.

According to the embodiment as shown in FIG. 7, when the condition preset by the reception channel is met, the channel page as shown in FIG. 7 is displayed in the client 2040. The triggering event corresponding to various menu items in the channel page is determined. The jump member information, channel identification information of the sub channel, shunt setting information (preset switching time, user threshold) corresponding to the triggered menu items is obtained. The reception channel switching information of the reception channel is generated. The reception channel information includes the channel identification information, the jump member information and the shunt setting information of the sub channel corresponding to the triggered menu items.

Preferably, via triggering the shunt setting menu items, the channel identification information of the sub channel corresponding to the jump channel menu items triggered is switched to the switching order and switching time of the channel information.

Figure 8:
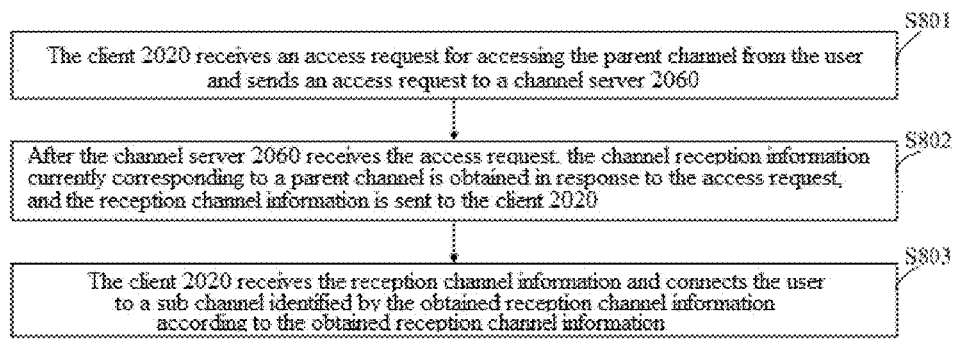
FIG. 8 depicts a schematic flow diagram of a channel access method according to a sixth embodiment of the present invention.

Referring to FIG. 8, FIG. 8 depicts a schematic flow diagram of a channel access method according to a sixth embodiment of the present invention.

The channel access method according to the sixth embodiment of the present invention includes the steps of:

Step S801, the client 2020 receives an access request for accessing a parent channel from the user and sends an access request to a channel server 2060;

Step S802, after the channel server 2060 receives the access request, the channel reception information currently corresponding to a parent channel is obtained in response to the access request, and the reception channel information is sent to the client 2020;

Step S803, the client 2020 receives the reception channel information and connects the user to a sub channel identified by the obtained reception channel information according to the obtained reception channel information.

According to one embodiment of the present invention, after the user logons the client 2020, the channel server 2060 sends the reception channel information of each parent channel to the client 2020. After the client 2020 receives an access request for accessing anyone of the parent channels from the client 2020, the reception channel information of the parent channel is retrieved and the user is connected to a sub channel identified by the reception channel information.

Figure 9:
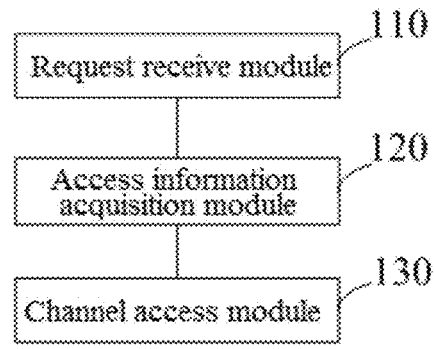
FIG. 9 depicts a schematic view of a channel access system according to a first embodiment of the present invention.

Referring to FIG. 9, FIG. 9 depicts a schematic view of a channel access system according to a first embodiment of the present invention.

The channel access system according to the first embodiment of the present invention includes a request receiving module 110, an access information acquisition module 120 and a channel access module 130.

The request receiving module 110 is configured to receive an access request for accessing a parent channel from the user.

The access information acquisition module 120 is configured to obtain the reception channel information currently corresponding to the parent channel in response to the access request, wherein the reception channel information is the channel identification information of a sub channel corresponding to the preset reception channel switching requirement.

The channel access module 130 is configured to connect the user to the sub channel identified by the obtained reception channel information according to the obtained reception channel information.

In the present embodiment, after the access request for accessing a parent channel from a user is received, the user is connected to a sub channel corresponding to the reception channel information currently corresponding to the parent channel. In this regard, the user requesting for access is connected to a preset sub channel, so as to realize user streaming, avoid network fault such as network congestion and network delay, and facilitate the channel administrator to administrate the channel user.

As to the request receiving module 110, the parent channel can be a big channel in the live class client. The sub channel is a sub channel included in the big channel. The channel identification information of the parent channel can be obtained according to the access request.

According to one embodiment of the present invention, the channel access system further includes a reception channel set module. Prior to receiving an access request from a user, the reception channel set module is configured to:

obtain the channel identification information of a sub channel corresponding to the preset reception channel switching requirement if the preset reception channel switching requirement is met;

obtain the channel identification information as the reception channel information currently corresponding to the parent channel and store the reception channel information corresponding to the parent channel.

As to the access information acquisition module 120, the reception channel can be the preferable access sub channel when the user request for accessing the parent channel. The reception channel information can be the identification number (ID) of the sub channel corresponding to the preset reception channel switching requirement, or other channel identification information of the sub channel.

Preferably, in response to an access request for obtaining the reception channel information currently corresponding to a parent channel, the reception channel information stored corresponding to the parent channel is enquired. If the reception channel information can be enquired, the enquired reception channel information is taken as the reception channel information currently corresponding to the parent channel.

In addition, during enquiring the reception channel information stored corresponding to the parent channel, the channel identification information of the parent channel can be read from the access request. The reception channel information stored corresponding to the parent channel can be enquired according to the channel identification information of the parent channel.

According to one embodiment of the present invention, the access information acquisition module 120 is further configured to:

enquire the reception channel information stored corresponding to the parent channel;

obtain the member class information of the users if the enquired reception channel information includes channel identification information of a number of sub channels;

enquire the preset reception class matching the member class information;

select the channel identification information of the sub channel corresponding to the preset reception class from the enquired reception channel information as the reception channel information currently corresponding to the parent channel;

wherein the identification information of the user can be obtained according to the access request, so as to further obtain the member class information stored corresponding to the identification information. The member class information includes member identification, full channel manager identification, guest identification, visitor identification. The preset reception class includes visitor identification and guest identification. Preferably, when the member class information is as same as the preset reception class, the member class identification matches the preset reception class.

According to one embodiment of the present invention, the access information acquisition module 120 is further configured to:

enquire the reception channel information stored corresponding to the parent channel;

obtain the current time if the enquired reception channel information includes the channel identification information of a number of sub channels;

select the channel identification information of a sub channel having a time range matching the current time from the enquired reception channel information as the reception channel information currently corresponding to the parent channel;

wherein, the current time is the current display time of the client the user logons, or the current display time of the backend server.

Preferably, the channel identification information includes a preset time range corresponding to the reception channel information of each sub channel (reception channel). For instance, for sub channels A, B and C, 8 clock to 10 clock of each day can be set as the time range corresponding to sub channel A, 10 clock to 12 clock of each day can be set as the time range corresponding to sub channel B, 12 clock to 14 clock of each day can be set as the time range corresponding to sub channel C. If the current time is within a time range, the time range matches the current time. In addition, for sub channels A, B and C, a first time interval (every 15 minutes is defined as a time interval) after a reference time is set as the time range corresponding to the sub channel A. A second time interval is set as the time range of corresponding to sub channel B. A third time interval is set as the time range corresponding to sub channel C. The reference time is the time when the current reception channel information is set as the time the reception channel information currently corresponding to the parent channel stored corresponding to the parent channel. If the time difference between the current time and the reference time is within a time range, then the time range corresponding to the time interval matches the current time.

According to one embodiment of the present invention, the access information acquisition module 120 is further configured to:

enquire the reception channel information stored corresponding to the parent channel;

obtain the number of the users in each sub channel if the enquired reception channel information includes the channel identification information of a number of sub channels;

select the channel identification information of the sub channel having a number of the users within the preset user number range from the enquired reception channel information as the reception channel information currently corresponding to the parent channel;

wherein the preset number range of the users is 0 to 100, or other number range according to the requirements of the client and the channel server. If the number of the users is within the user threshold, the preset user number range is met.

Preferably, a user threshold is set. The channel identification information of a sub channel having a user number larger than the user threshold from the enquired reception channel information as the reception channel information currently corresponding to the parent channel.

As to the channel access module 130, according to the reception channel information, the user is connected to the sub channel identified by the reception channel information.

According to one embodiment of the present invention, the channel access system includes a reception channel switching module. After the user is connected to the sub channel identified by the obtained reception channel information according to the obtained reception channel information, the reception channel switching module is configured to:

obtain the channel identification information of the sub channel corresponding to the preset reception channel switching requirement if the preset reception channel switching requirement is met;

switch the obtained channel identification information to the reception channel information currently corresponding to the parent channel;

wherein there may be a number of sub channels corresponding to the preset reception channel switching requirement, each time the preset reception channel condition is met, the channel identification information of a sub channel corresponding to the preset reception channel switching requirement is obtained randomly or in a preset order, and the channel identification information is switched to a reception channel information currently corresponding to the parent channel Preferably, the channel access system includes a reception channel identification module, configured to obtain the preset reception channel identification information after the obtained channel identification information is switched to the reception channel information currently corresponding to the parent channel, and add the preset reception channel identification information to the sub channel in the channel list of the parent channel.

In addition, the reception channel identification information includes colors (red or purple), icon or number. After the access request for accessing the parent channel from the user is received, the reception channel information stored corresponding to the parent channel is enquired. If the enquired reception channel information includes channel identification information of a number of sub channels, the sub channel having the preset reception channel identification information in the channel list of the parent channel is enquired, the channel identification information of the sub channel is selected from the enquired reception channel information as the reception channel information currently corresponding to the parent channel.

According to another embodiment of the present invention, the reception channel switching module is further configured to:

detect the reception channel switching instruction corresponding to each sub channel;

determine the preset reception channel switching requirement is met if the switching instruction is detected;

obtain the channel identification information of the sub channel corresponding to the switching instruction as the channel identification information of the sub channel corresponding to the preset reception channel switching requirement;

wherein the sub channel corresponding to the switching instruction can be a sub channel identified by the channel identification information included in the reception channel switching instruction.

According to one embodiment of the present invention, the reception channel switching module is further configured to:

detect whether the current time is accordance with the preset switching time;

determine the preset reception channel switching requirement is met if the current time is accordance with the preset switching time;

obtain the channel identification information of the sub channel corresponding to the preset switching time as the channel identification information of the sub channel corresponding to the preset reception channel switching requirement;

wherein the preset switching time can be a number of fixed times in each day, with each fixed time corresponding to a sub channel, when the current time is any one of the fixed times, determine the preset reception channel switching requirement is met.

According to one embodiment of the present invention, the reception channel switching module is further configured to:

enquire the number of the users in the sub channel corresponding to the current reception channel information is larger than a user threshold;

determine the preset reception channel switching requirement is met if the number of the users in the sub channel corresponding to the current reception channel information is larger than the user threshold;

obtain the channel identification information of the preset candidate sub channel as the channel identification information of the sub channel corresponding to the preset reception channel switching requirement;

wherein the user threshold is 100 or other value set according to the requirement of the client and the channel server.

The channel access system according to a second embodiment of the present invention will be detailed as following.

The channel access system according to the second embodiment of the present invention differs from the channel access system according to the first embodiment of the present invention in that, the reception channel switching module is further configured to:

obtain the member class information of the users currently requesting for accessing the parent channel;

enquire the preset reception class matching the member class information;

determine the preset reception channel switching requirement is met if the preset reception class matching the member class information is enquired;

obtain the channel identification information of the sub channel corresponding to the enquired preset reception class as the channel identification information of the sub channel corresponding to the preset reception channel switching requirement.

According to the present invention, different classes of users can be connected to different sub channels according to the member class information of the users.

Preferably, when the access request for accessing a parent channel form a user is received again, the member class information of the users currently requesting for accessing the parent channel is obtained. The identification information of the current user is obtained according to the current access request, to further obtain the stored member class information corresponding to the identification information. The member class information includes member identification, full channel manager identification, guest identification, visitor identification. The preset reception class includes visitor identification and guest identification. Preferably, when the member class information is as same as the preset reception class, the member class identification matches the preset reception class.

Preferably, when there are a number of sub channels corresponding to the preset reception class, the channel identification information of one sub channel corresponding to the enquired preset reception class is obtained randomly or in a preset order.

According to one embodiment of the present invention, the reception channel switching module is further configured to:

determine whether the number of the users in the sub channel corresponding to the enquired preset reception class is larger than the user threshold;

obtain the channel identification information of the sub channel corresponding to the enquired preset reception class as the channel identification information of the sub channel corresponding to the preset reception channel switching requirement if the number of the users in the sub channel corresponding to the enquired preset reception class is no more than the user threshold;

obtain the channel identification information of other candidate sub channels corresponding to the enquired preset reception class as the channel identification information of the sub channel corresponding to the preset reception channel switching requirement if the number of the users in the sub channel corresponding to the enquired preset reception class is larger than the user threshold;

wherein when there are a number of sub channels corresponding to the preset reception class, one of the sub channel can be set as preferable sub channel, and the other sub channels can be set as candidate sub channels. When the user number in the preferable sub channel is larger than the user threshold, the channel identification information of one sub channel corresponding to the enquired preset reception class is obtained, and the channel identification information is switched to the reception channel information.

According to another embodiment of the present invention, the reception channel switching module is further configured to:

determine whether the current time is in accordance with the preset switching time;

obtain the channel identification information of the sub channel corresponding to the enquired preset reception class as the channel identification information of the sub channel corresponding to the preset reception channel switching requirement if the current time is not in accordance with the preset switching time;

obtain the channel identification information of other candidate sub channels corresponding to the enquired preset reception class as the channel identification information of the sub channel corresponding to the preset reception channel switching requirement if the current time is in accordance with the preset switching time.

The channel access system according to a third embodiment of the present invention will be detailed as following.

The channel access system according to the third embodiment of the present invention differs from the channel access system according to the first embodiment of the present invention in that, the reception channel switching module is further configured to:

obtain the identification information of the current user currently requesting for accessing the parent channel;

enquire the sub channel access record of the current users in the parent channel according to the enquired identification information;

select the sub channel having the most access record in the sub channel access record;

determine the preset reception channel switching requirement is met if the sub channel having the most access record is selected;

obtain the channel identification information of the selected sub channel as the channel identification information of the sub channel corresponding to the preset reception channel switching requirement.

In the present embodiment, the sub channel in the parent channel that has been accessed by the most users can be determined as the preferable channel when the user requests for accessing the parent channel, so as to reduce the channel jump time of the user in the parent channel and improve the channel access efficiency of the user, wherein, the sub channel that has been recorded most is preferably the other sub channels of the parent channel except the top channel.

Figure 10:
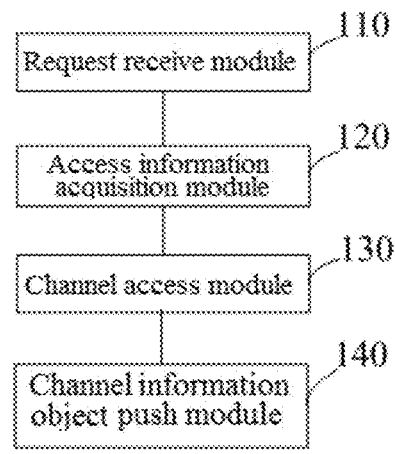
FIG. 10 depicts a schematic view of a channel access system according to a fourth embodiment of the present invention.

Referring to FIG. 10, FIG. 10 illustrates a schematic view of a channel access system according to a fourth embodiment of the present invention.

The channel access system according to the fourth embodiment of the present invention differs from the channel access system according to the first embodiment of the present invention in that, the channel access system according to the fourth embodiment of the present invention includes a channel information object push module 140 configured to push a preset channel information object to a preset default region of a channel display interface of a client the user logons and display the preset channel information object in the preset default region of channel display interface.

According to the present invention, the preset channel information object is highlighted in the client the user logons, so as to improve the efficiency of information push.

According to one embodiment of the present invention, the channel information object push module 140 is further configured to:

push the preset channel information object to a center area of the channel display interface of the client and display the preset channel information object to in the center area if the sub channel the user accessed is not in a live video status;

push the preset channel information object to an area outside the video display area of the center area of the channel display interface of the client and display the preset channel information object in the area if the sub channel the user accessed is in a live video status.

Preferably, the preset channel information object may have a form of character, picture, video and/or web page.

It should be understood by one ordinary skilled in the art that, all or part of the process according to the embodiments of the present invention can be accomplished via computer program related hardware. The computer program can be stored in one or more computer readable storage medium. The execution of the computer program includes process in the embodiments as detailed previously. The computer readable storage medium is a disk, a CD, a Read-Only Memory (ROM) or a Random Access Memory (RAM).

Figure 11:
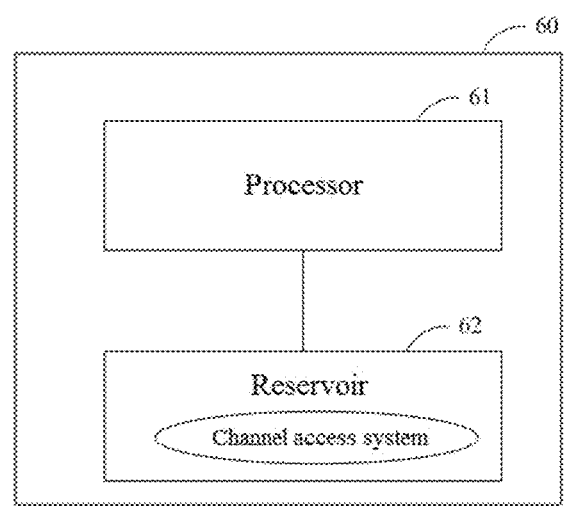
FIG. 11 depicts a schematic view of an operating environment of the channel access system according to one embodiment of the present invention.

Referring to FIG. 11, FIG. 11 illustrates a schematic view of an operating environment of the channel access system according to one embodiment of the present invention.

The channel access system can run in electronic equipments including a processor 61 and a reservoir 62. According to one embodiment of the present invention, the electronic equipment 60 is a PC, a laptop, a smart mobile phone or other electronic equipments.

The reservoir 62 of the electronic equipment 60 is configured to store the program instruction corresponding to the channel access system. The processor 61 is configured to read and run the program instructions corresponding to the channel access system from the reservoir 60, so as to realize the channel access as shown in FIG. 2 to FIG. 8.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions describe example embodiments, it should be appreciated that alternative embodiments without departing from the scope of the appended claims. Although specific terms are employed herein, they are used in a generic and descriptive sense only and not for purposes of limitation.

What is claimed is:

1. A channel access method, comprising the steps of:
receiving an access request for accessing a parent channel from a user;
obtaining a reception channel information currently corresponding to the parent channel in response to the access request, wherein the reception channel information is a channel identification information of a sub channel corresponding to a preset reception channel switching requirement;
connecting the user to the sub channel identified by the obtained reception channel information according to the obtained reception channel information;

obtaining the channel identification information of the sub channel corresponding to the preset reception channel switching requirement if the preset reception channel switching requirement is met; and switching the channel identification information obtained to the reception channel information currently corresponding to the parent channel.

2. The channel access method of claim 1, wherein the step of obtaining the channel identification information of the sub channel corresponding to the preset reception channel switching requirement if the preset reception channel switching requirement is met comprises the steps of:

detecting a reception channel switching instruction corresponding to each sub channel;

determining the preset reception channel switching requirement is met if the switching instruction is detected; and obtaining the channel identification information of the sub channel corresponding to the switching instruction as the channel identification information of the sub channel corresponding to the preset reception channel switching requirement.

3. The channel access method of claim 1, wherein the step of obtaining the channel identification information of the sub channel corresponding to the preset reception channel switching requirement if the preset reception channel switching requirement is met comprises the steps of:

detecting whether a current time is in accordance with a preset switching time;

determining the preset reception channel switching requirement is met if the current time is in accordance with the preset switching time; and obtaining the channel identification information of the sub channel corresponding to the preset switching time as the channel identification information of the sub channel corresponding to the preset reception channel switching requirement.

4. The channel access method of claim 1, wherein the step of obtaining the channel identification information of the sub channel corresponding to the preset reception channel switching requirement if the preset reception channel switching requirement is met comprises the steps of:

enquiring whether a number of the users in the sub channel currently corresponding to the reception channel information is larger than a user threshold;

determining the preset reception channel switching requirement is meet if the number of the users in the sub channel currently corresponding to the reception channel information is larger than the user threshold; and obtaining the channel identification information of a preset candidate sub channel as the channel identification information of the sub channel corresponding to the preset reception channel switching requirement.

5. The channel access method of claim 1, wherein the step of obtaining the channel identification information of the sub channel corresponding to the preset reception channel switching requirement if the preset reception channel requirement is met comprises the steps of:

obtaining a member class information of the users currently requesting for accessing the parent channel;

enquiring a preset reception class matching the member class information;

determining the preset reception channel switching requirement is met if the preset reception class matching the member class information is enquired; and obtaining the channel identification information of the sub channel corresponding to the enquired preset reception class as the channel identification information of the sub channel corresponding to the preset reception channel switching requirement.

6. The channel access method of claim 1, wherein the step of obtaining the channel identification information of the sub channel corresponding to the preset reception channel switching requirement if the preset reception channel switching requirement is met comprises the steps of:

obtaining an identification information of the user currently requesting for accessing the parent channel;

enquiring a sub channel access record of the current user in the parent channel according to the identification information;

selecting a sub channel having a most accessing record from the sub channel access record;

determining the preset reception channel switching requirement is met if the sub channel having a most accessing record is selected; and obtaining the channel identification information of the selected sub channel as the channel identification information of the sub channel corresponding to the preset reception channel switching requirement.

7. The channel access method of claim 1, wherein after the step of connecting the user to the sub channel identified by the obtained reception channel information according to the obtained reception channel information, the channel access method further comprises the steps of:

pushing a preset channel information object to a preset area of a channel display interface where the users logon the client and displaying the preset channel information object in the preset area.

8. The channel access method of claim 7, wherein the step of pushing a preset channel information object to a preset area of a channel display interface where the users logon the client and displaying the channel information object in the preset area further comprises the steps of:

pushing and displaying the preset channel information object to a central area of the channel display interface of the client if the sub channel the user accessing is not in a live video status; and pushing and displaying the preset channel information object to an area other than the central area of the channel display interface of the client if the sub channel the user accessing is in a live video status.

9. A channel access system, comprising:

a request receiving module, configured to receive an access request for accessing a parent channel from a user;

an access information acquisition module configured to obtain a reception channel information currently corresponding to the parent channel in response to the access request, wherein the reception channel information is a channel identification information of a sub channel corresponding to a preset reception channel switching requirement;

a channel access module, configured to connect the user to a sub channel identified by the obtained reception channel information according to the obtained reception channel information; and a reception channel switching module configured to:

obtain a channel identification information of the sub channel corresponding to a preset reception channel switching requirement if the preset reception channel switching requirement is met; and switch the obtained channel identification information into the reception channel information currently corresponding to the parent channel.

10. The channel access system of claim 9, wherein the reception channel switching module is further configured to:
detect a reception channel switching instruction corresponding to each sub channel;
determine the preset reception channel switching requirement is met if the switching instruction is detected; and
obtain the channel identification information of the sub channel corresponding to the switching instruction as the channel identification information of the sub channel corresponding to the preset reception channel switching requirement.

11. The channel access system of claim 9, wherein the reception channel switching module is further configured to:
detect whether a current time is in accordance with a preset switching time;
determine the preset reception channel switching requirement is met if the current time is in accordance with the preset switching time; and
obtain the channel identification information of the sub channel corresponding to the preset switching time as the channel identification information of the sub channel corresponding to the preset reception channel switching requirement.

12. The channel access system of claim 9, wherein the reception channel switching module is further configured to:
enquire whether a number of the users in the sub channel currently corresponding to the reception channel information is larger than a user threshold;
determine the preset reception channel switching requirement is met if the number of the users in the sub channel currently corresponding to the reception channel information is larger than a user threshold; and
obtain the channel identification information of a preset candidate sub channel as the channel identification information of the sub channel corresponding to the preset reception channel switching requirement.

13. The channel access system of claim 9, wherein the reception channel switching module is further configured to:
obtain a member class information of the user currently requesting for accessing the parent channel;
enquire a preset reception class matching the member class information;
determine the preset reception channel switching requirement is met if the preset reception class matching the member class information is enquired; and
obtain a channel identification information of the sub channel corresponding to the enquired preset reception class as the channel identification information of the sub channel corresponding to the preset reception channel switching requirement.

14. A computer storage media comprising one or more computer-executable instructions configured to execute a channel access method comprising the steps of:
receiving an access request for accessing a parent channel from a user;
obtaining a reception channel information currently corresponding to the parent channel in response to the access request, wherein the reception channel information is a channel identification information of a sub channel corresponding to a preset reception channel switching requirement;
connecting the user to a sub channel identified by the obtained reception channel information according to the obtained reception channel information;
obtaining the channel identification information of the sub channel corresponding to the preset reception channel switching requirement if the preset reception channel requirement is met; and
switching the obtained channel identification information to the reception channel information currently corresponding to the parent channel.

15. The computer storage media of claim 14, wherein the step of obtaining the channel identification information of the sub channel corresponding to the preset reception channel switching requirement if the preset reception channel switching requirement is met comprises the steps of:
detecting a reception channel switching instruction corresponding to each sub channel;
determining the preset reception channel switching requirement is met if the switching instruction is detected; and
obtaining the channel identification information of the sub channel corresponding to the switching instruction as the channel identification information of the sub channel corresponding to the preset reception channel switching requirement.

16. The computer storage media of claim 14, wherein the step of obtaining the channel identification information of the sub channel corresponding to the preset reception channel switching requirement if the preset reception channel switching requirement is met comprises the steps of:
detecting whether a current time is in accordance with a preset switching time;
determining the preset reception channel switching requirement is met if the current time is in accordance with the preset switching time; and
obtaining the channel identification information of the sub channel corresponding to the preset switching time as the channel identification information of the sub channel corresponding to the preset reception channel switching requirement.

17. The computer storage media of claim 14, wherein the step of obtaining the channel identification information of the sub channel corresponding to the preset reception channel switching requirement if the preset reception channel switching requirement is met comprises the steps of:
enquiring whether a number of the users in the channel currently corresponding to the reception channel information is larger than a user threshold;
determining the preset reception channel switching requirement is meet if the number of the users in the channel currently corresponding to the reception channel information is larger than the user threshold; and
obtaining the channel identification information of the preset candidate sub channel as the channel identification information of the sub channel corresponding to the preset reception channel switching requirement.

18. The computer storage media of claim 14, wherein the step of obtaining the channel identification information of the sub channel corresponding to the preset reception channel switching requirement if the preset reception channel switching requirement is met comprises the steps of:
obtaining a member class information of the user currently requesting for accessing the parent channel;
enquiring a preset reception class matching the member class information;
determining the preset reception channel switching requirement is met if the preset reception class matching the member class information is enquired; and
obtaining the channel identification information of the sub channel corresponding to the enquired preset reception class as the channel identification information of the sub channel corresponding to the preset reception channel switching requirement.

* * * * *